C. L. BOND.
AUTOMATIC WEIGHING MACHINE.
APPLICATION FILED JAN. 28, 1919.
1,374,876.
Patented Apr. 12, 1921.
6 SHEETS—SHEET 2.
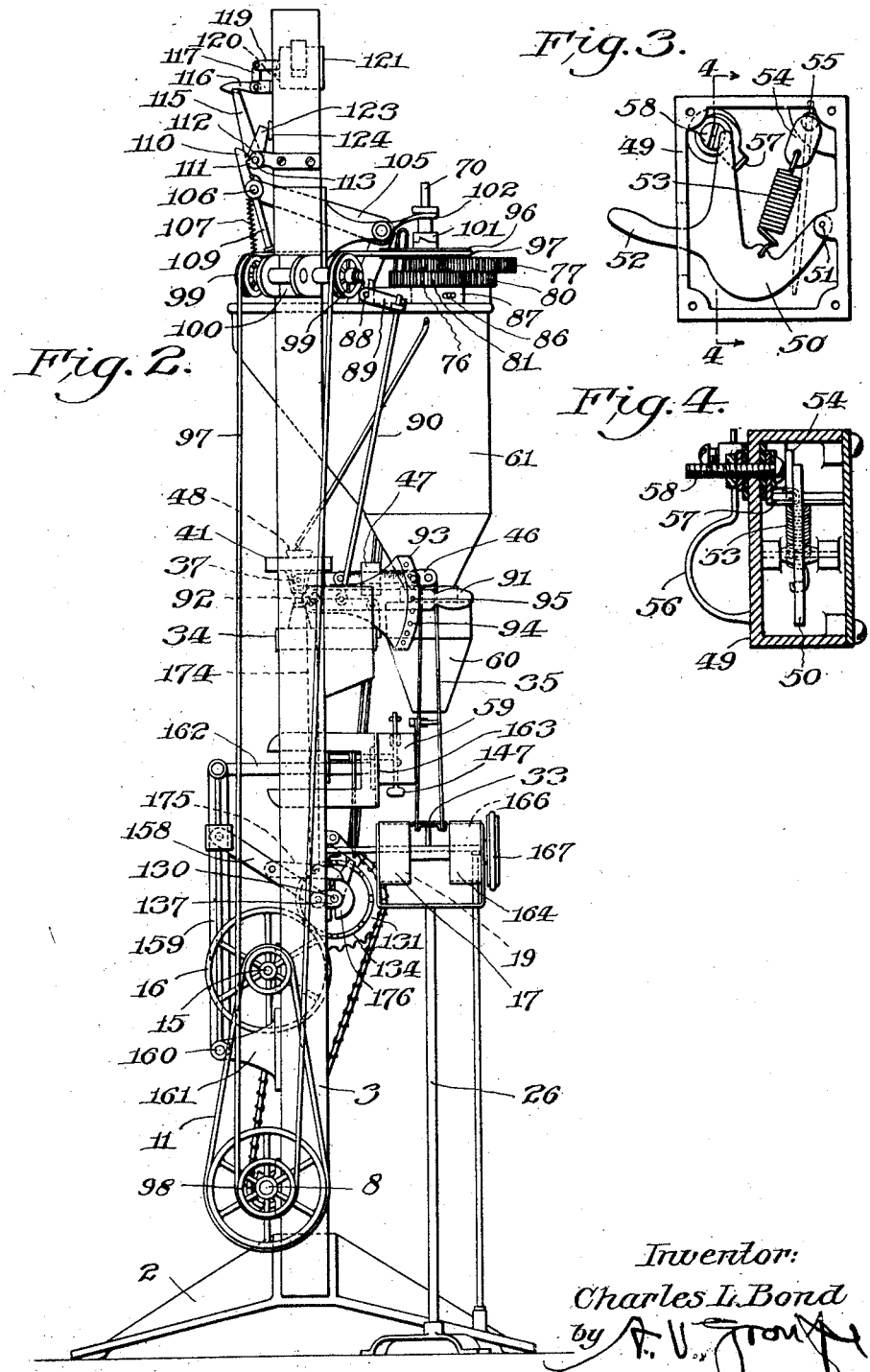
Inventor:
Charles L. Bond
by [signature]
Attorney

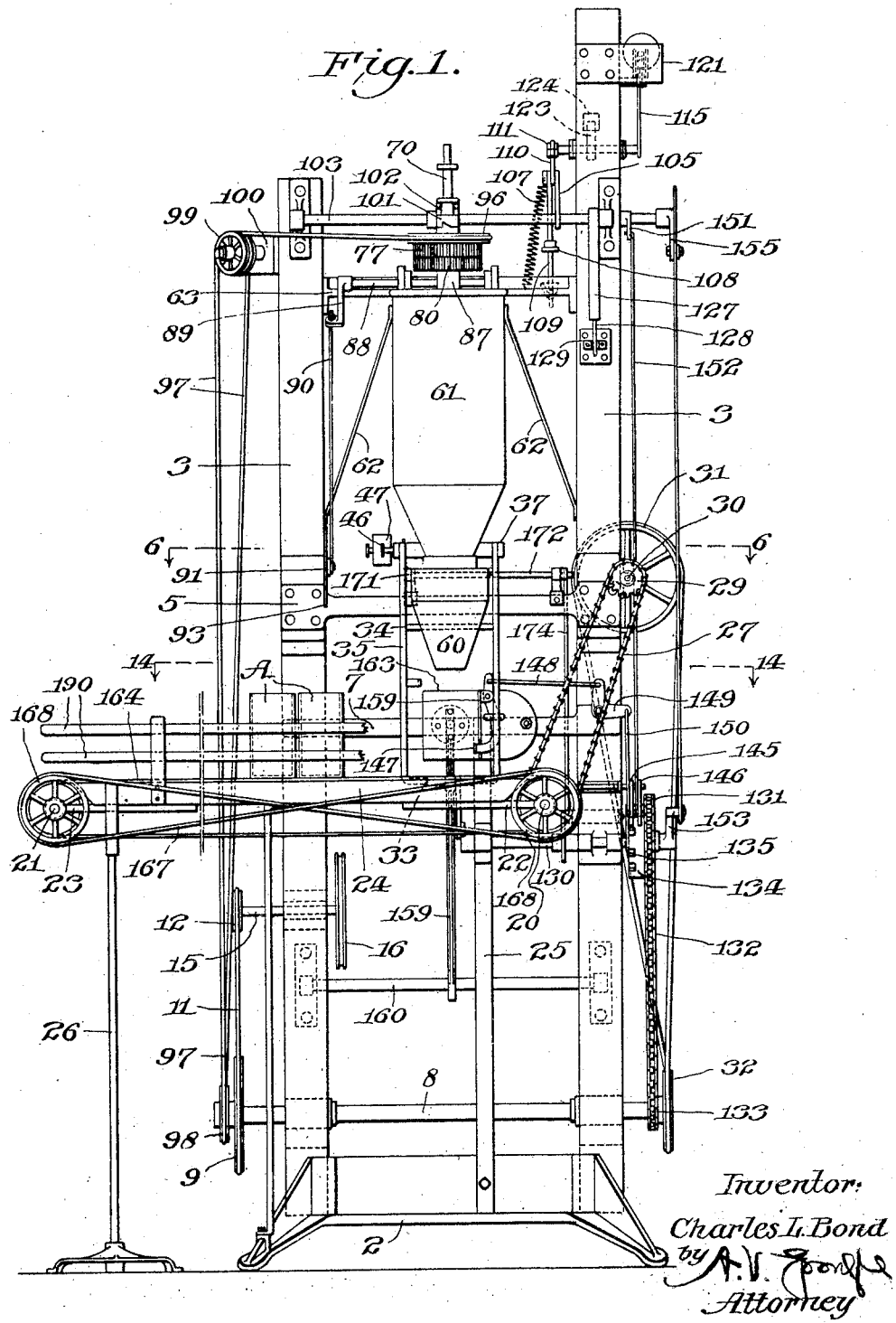

C. L. BOND.
AUTOMATIC WEIGHING MACHINE.
APPLICATION FILED JAN. 28, 1919.

1,374,876.

Patented Apr. 12, 1921.
6 SHEETS—SHEET 3.

Inventor:
Charles L. Bond
by A. V. Trott
Attorney

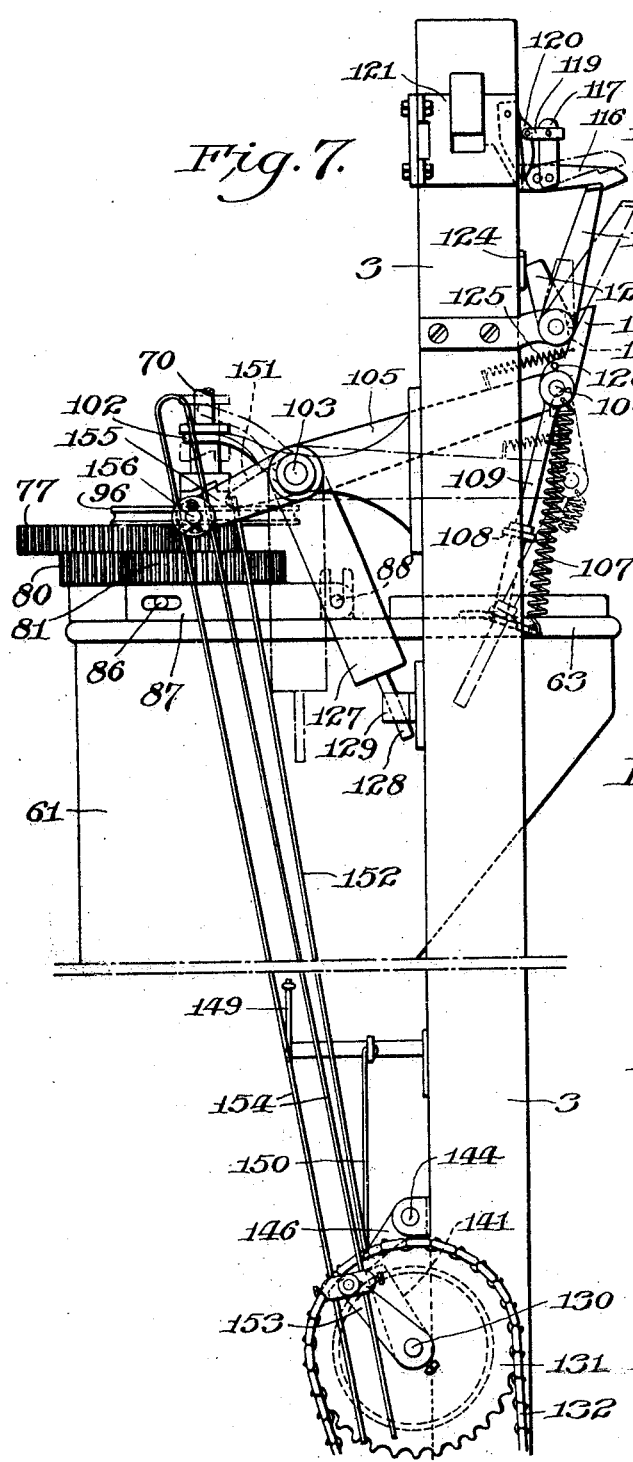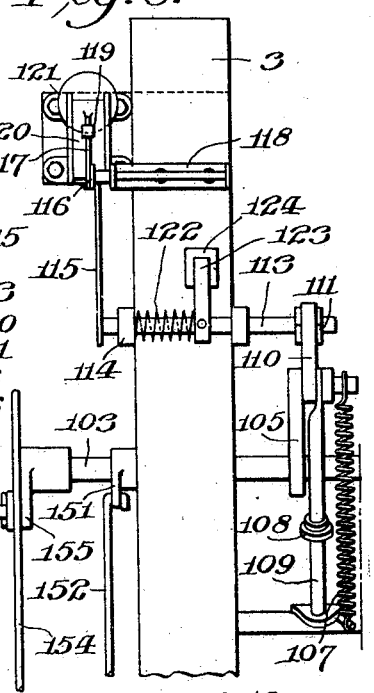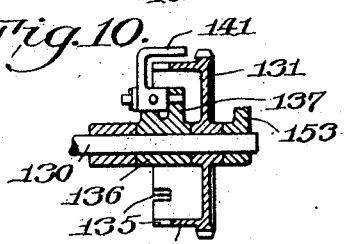

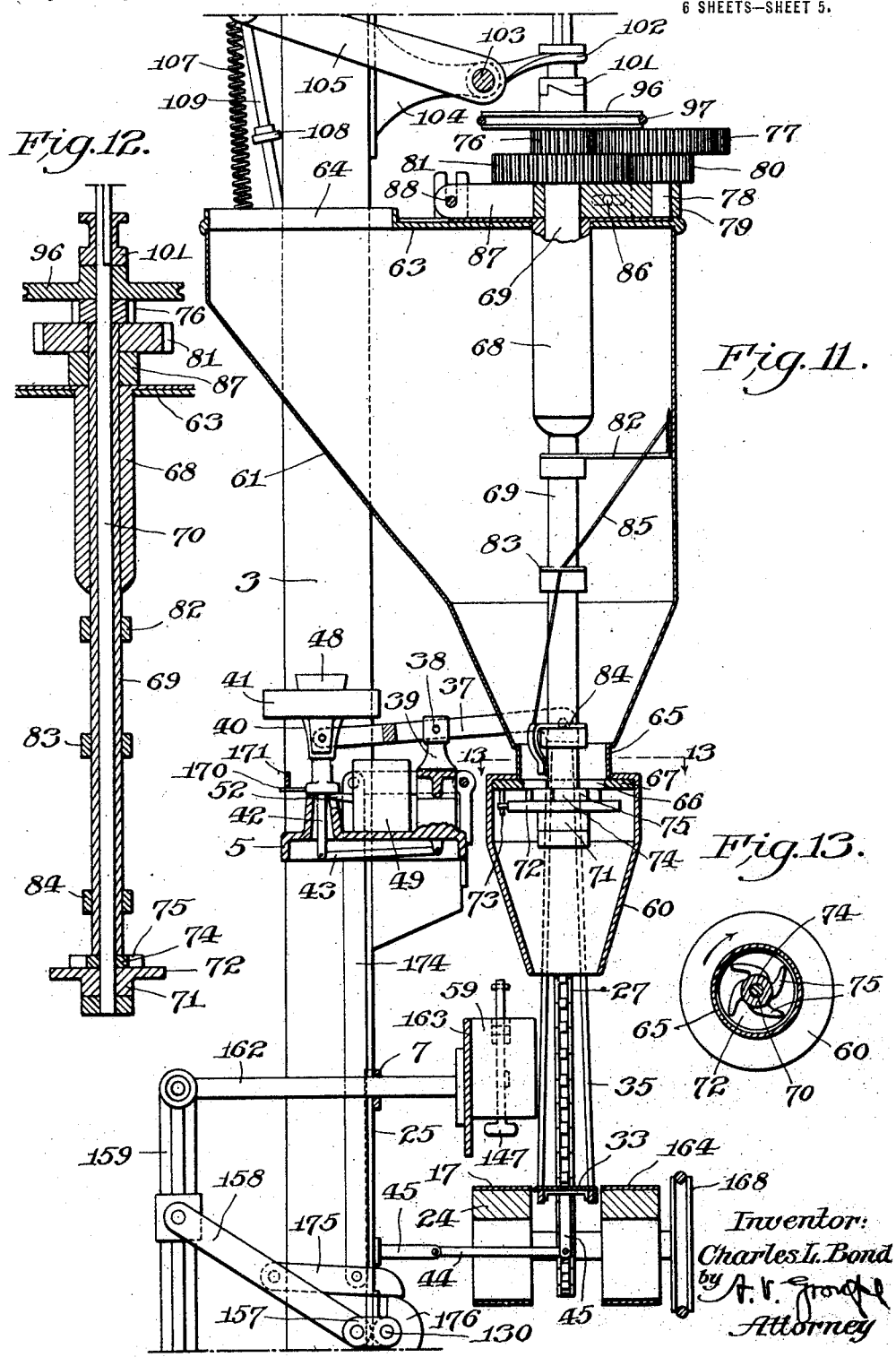

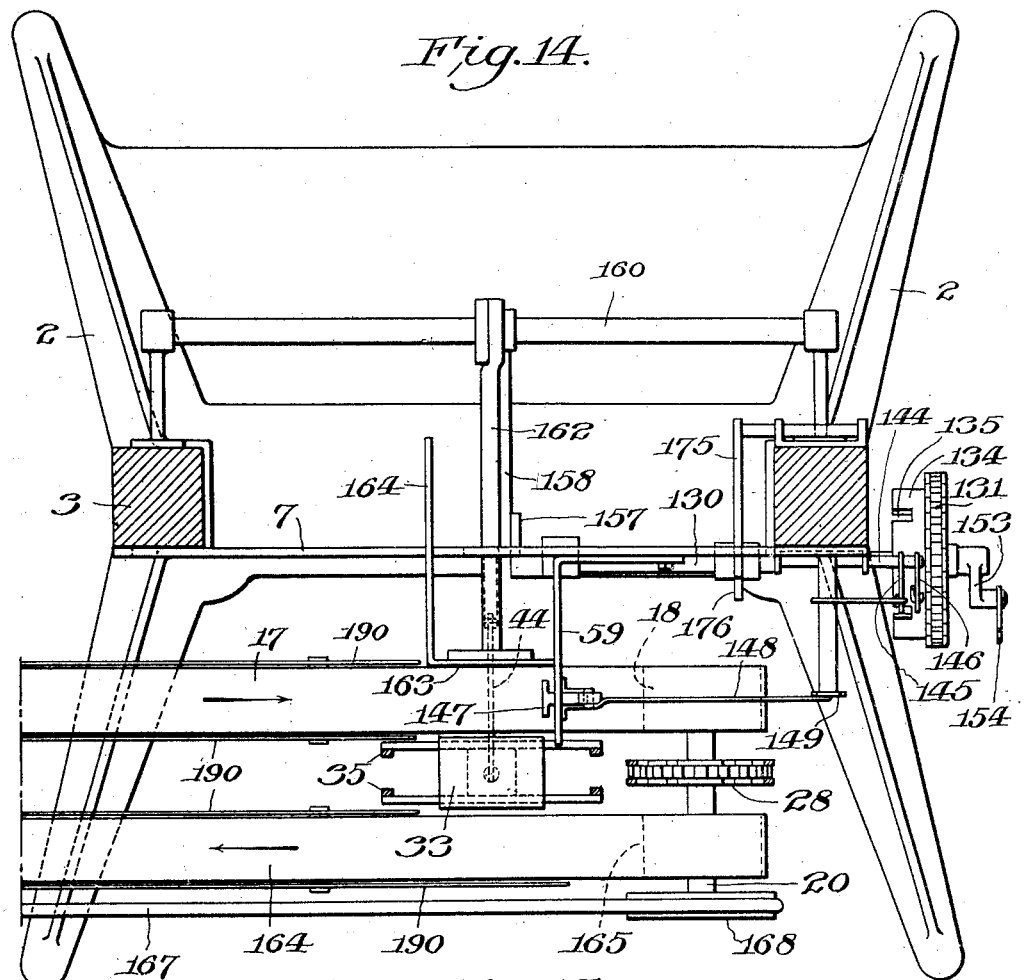
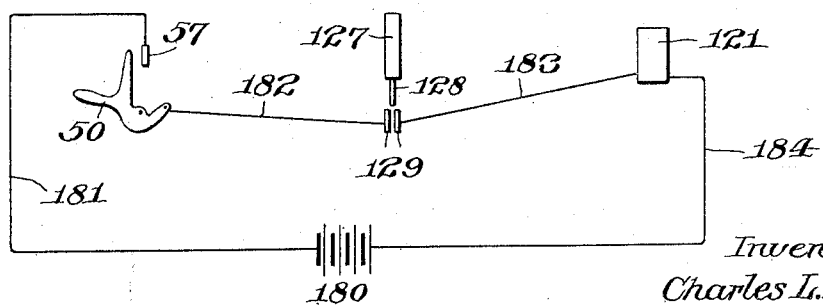

UNITED STATES PATENT OFFICE.

CHARLES L. BOND, OF PHILADELPHIA, PENNSYLVANIA.

AUTOMATIC WEIGHING-MACHINE.

1,374,876.　　　　Specification of Letters Patent.　　Patented Apr. 12, 1921.

Application filed January 28, 1919. Serial No. 273,622.

*To all whom it may concern:*

Be it known that I, CHARLES L. BOND, a citizen of the United States, residing at Philadelphia, in the county of Philadelphia and State of Pennsylvania, have invented certain new and useful Improvements in Automatic Weighing-Machines, of which the following is a specification.

My invention relates to improvements in automatic weighing machines; and the object of my invention is to provide a novel, simple and efficient construction and organization of mechanism: first, whereby empty cartons fed to the machine shall be successively advanced to and upon the receiving platform of a weighing scale; second, whereby a predetermined quantity of material may be introduced to each carton, from a suitable hopper, while on the said platform; third, whereby the operation of the weighing scale shall control the devices for supplying the material from the hopper to the cartons to automatically stop the supply immediately after the desired quantity in weight has been introduced to each successive carton; fourth, whereby the cartons may be successively and automatically advanced from the weighing scale platform as rapidly as they are supplied with material; fifth, whereby the starting of the operation of the devices for supplying the material from the hopper to the cartons shall be controlled by the cartons passing through the machine, so that no material shall be fed from the hopper when there is no empty carton present to receive it; and, sixth, whereby various novel advantages are gained.

With the above and related objects in view, the invention consists in the novel construction and combinations of parts hereinafter described and claimed.

In the accompanying drawings, illustrating my invention,

Figure 1 is a front elevation of a weighing machine embodying my invention.

Fig. 2 is a side elevation thereof.

Fig. 3 is a side view of the box containing the electric circuit making and breaking device controlled by the weighing scale, with the side plate removed.

Fig. 4 is a section through the box shown in Fig. 3, on line 4—4 of Fig. 3.

Fig. 7 is an elevation of a portion of one side of the machine.

Fig. 8 is a rear view of the parts shown in the upper portion of Fig. 7.

Fig. 9 is a section through the controlling shaft, showing its clutch and adjuncts.

Fig. 10 is a section through the controlling shaft clutch, on line 10—10 of Fig. 9.

Fig. 11 is a vertical section through the hopper, the weighing scale and adjuncts.

Fig. 12 is a vertical section through the feeding devices which extend into the hopper.

Fig. 13 is a horizontal section through the hopper, on line 13—13 of Fig. 11.

Fig. 14 is a horizontal section through the machine, on line 14—14 of Fig. 1.

Fig. 15 is a diagrammatic view showing the electrical connections.

Figure 5:
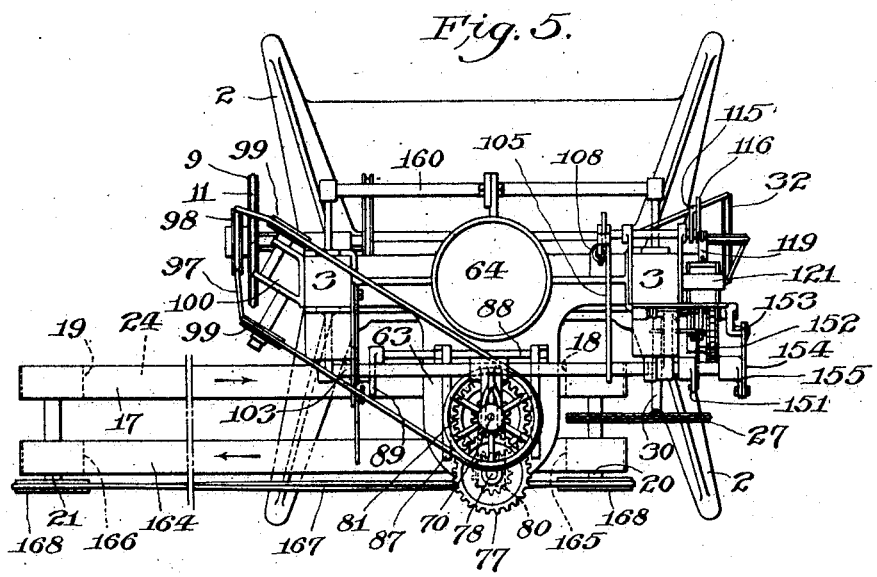
Fig. 5 is a top view of the machine.
Figure 6:
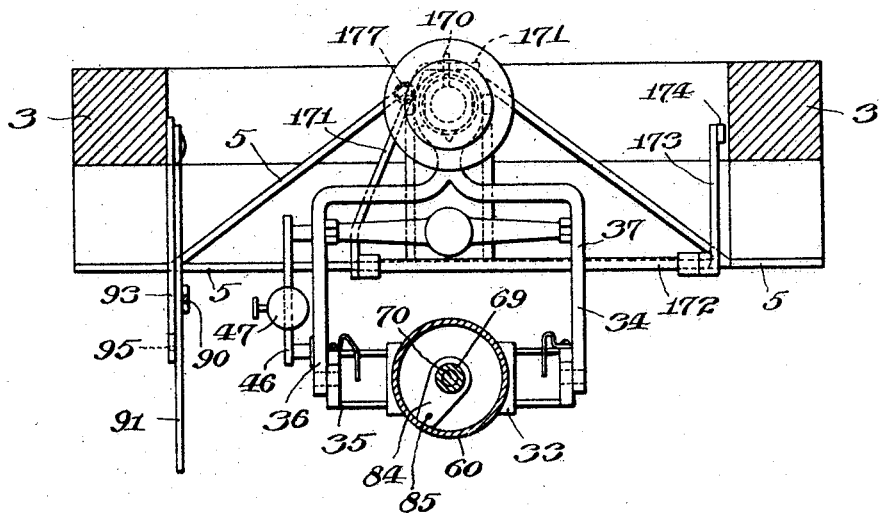
Fig. 6 is a horizontal section through the machine, on line 6—6 of Fig. 1, showing the weighing scale and adjuncts.

Referring to the drawings, the main frame of the machine, as generally stated, comprises a suitable base 2, a pair of parallel standards 3 secured to and rising from the base 2, and bars 5 and 7 connecting the standards 3.

The main driving shaft 8 of the machine is mounted to turn in bearings on the standards 3 and it is provided with a pulley 9 which is connected by a belt 11 with a pulley 12 on a speed reducing shaft 15 which turns in bearings on one of the standards 3. The shaft 15 carries a pulley 16 by means of which it may be driven to drive the main shaft 8 from any suitable source of power, preferably an electric motor which may be mounted on the frame of the machine.

A horizontally extending belt 17 is provided to receive and advance the cartons or other receptacles A (Fig. 1) to be filled. This belt 17 passes around pulleys 18 and 19 on shafts 20 and 21 which turn in bearings 22 and 23, respectively. The bearings 22 and 23 are supported by the respective ends of a platform 24 over which the upper portion of the belt 17 passes supported thereby to prevent the belt from sagging under the weight of the cartons. One end of the platform 24 is supported by a bar or bracket 25 on the main frame of the machine, and the other end thereof is supported by a standard 26 which rests upon the floor with the base 2.

The shaft 20 is actuated by a sprocket chain 27 which passes around a sprocket wheel 28 on the shaft 20 and a sprocket wheel 29 on a shaft 30 which turns in bearings on one of the standards 3. The shaft 30 carries a pulley 31 which is belted with a pulley 32 on the main shaft 8, whereby, when power is applied to the main shaft 8, the belt 17 will be advanced in the direction of the arrow.

As the cartons are advanced by the belt 17 they are brought successively into a position directly in rear of the platform 33 of a weighing scale 34. The platform 33 is carried by a U-shaped frame 35 the upper ends of the side arms of which are pivoted to the bifurcated forward arm 36 of the balance member 37 of the scale 34. The balance member 37 is pivoted or fulcrumed, at 38, on a bracket 39 on the frame bar 5, and the rearward arm of the member 37 is pivoted to a vertical member 40 having a platform or plate 41 on its upper end to receive weighing weights of different denominations. The member 40 has a downwardly projecting pin 42 which works within a hollow boss on the frame bar 5. The lower end of the pin 42 is pivoted to the rearward end of an arm 43 the forward end of which is pivoted to the bar 5 beneath the pivot 38 of the balance member 37 to maintain the member 40 in vertical position, as it is raised and lowered during the rocking of the balance member. The U-shaped frame 35 is also maintained in vertical position, as it is raised and lowered by the rocking of the balance member 37, by an arm 44 having its forward end pivoted to a pin 45ª projecting downwardly from the platform 33 and its rearward end pivoted, beneath the pivot 38 of the balance member 37, to a bracket 45 on the vertical bar 25. The balance member 37 is provided with a side plate or bar 46 having a slidable weight 47 fitted thereto, and provided with suitable graduations with which the weight 47 is adapted to register to vary the weighing operation of the scale 34. By placing different weights 48 on the platform 41, and by moving the weight 47 on the bar 46, the scale may be adjusted to a nicety to cause any desired weight placed upon the platform 33 to overbalance the rearward arm of the balance member 37 and lower the platform 33 to effect the weighing operation.

The balance member 37 of the weighing scale 34 is adapted to operate an electrical contact making and breaking device which I shall now describe.

Mounted on the frame bar 5 adjacent to the vertical member 40 of the scale is a box 49 in which a lever 50 is fulcrumed, at 51. The lever 50 is provided with an outwardly extending arm 52 which is adapted to be engaged by a flange on the scale member 40 to hold the lever 52 down against the action of a spring 53, when the scale balance member 37 and the vertical member 40 carried thereby are down. One end of the spring 53 is connected to the lever 52 and the other end thereof is connected to an arm 54 on a shaft 55 which is adapted to turn in a bearing in the wall of the box 49. The shaft 55 extends outwardly from the box 49 and carries a spring arm 56 which is adapted to engage the side wall of the box and hold the shaft 55 and arm 54 in different positions of adjustment to which they may be turned. By thus adjusting the shaft 55 and arm 54 the tension or pull of the spring 53 may be nicely regulated. When the scale member 40 is raised, the spring 53 is permitted to raise the lever 50 into contact with an arm 57 secured within the box 49 by a screw 58, which penetrates the side wall of the box. The screw 58 and arm 57 are electrically connected and insulated from the box 49, and the lever 50 is electrically connected to the box 49; and the lever 50 and arm 57 form an electrical contact making and breaking device which is adapted to close a circuit, when the scale member 40 is raised to permit the spring 53 to move the lever 50 into contact with the arm 57, and which is adapted to open the circuit when the scale member 40 is lowered to move the lever 50 out of contact with the arm 57 for a purpose hereinafter explained.

The forward movement of the cartons by the belt 17 is arrested by a stop plate 59 projecting from the frame bar 7, as the cartons are successively carried into position in rear of the scale platform 33, and, by mechanism hereinafter described, the cartons are successively pushed from the belt 17 and onto the platform 33. When each successive carton is on the platform 33 it is directly beneath the discharge spout 60 of a hopper 61 which is adapted to contain the material to be introduced to the cartons.

The hopper 61 is supported by braces 62 extending between it and the standards 3 and by a top bracket 63 which extends between and is secured to the standards 3. The bracket 63 forms a cover for the hopper 61 and it is provided with an opening 64 through which the material may be dumped into the hopper. The hopper 61 is shaped as illustrated, having downwardly converging or tapered walls which terminate in a tubular bottom portion 65. Secured to or formed on the bottom of the hopper 61 is a horizontal plate 67 having a central opening 66 therein and providing an outwardly extending flange for supporting the spout 60 which has a flange on the upper end thereof extending inwardly over the plate 67. The material passes from the hopper 61 through the opening 66 and down through the spout 60 and is discharged from the bottom thereof into the carton upon the scale platform 33.

Secured to the top of the hopper bracket 63 is a plate carrying a bearing 68 which extends down through the bracket 63 and into the hopper 61. Fitted to turn in the bearing 68 is a tubular shaft 69, and extending through the shaft 69 is a central shaft 70. The shaft 70 extends below the shaft 69 and carries a collar 71 provided on its upper end with an annular flange or plate 72 which extends outwardly below the plate 67 and over which the material from the hopper 61 passes as it leaves the hopper and enters the nozzle 60. A pin 73 projecting from the plate 67 and engaging a pin on the plate 72 prevents the plate 72 from turning when the shaft 70 is turned. Secured to the shaft 70 between the plate 72 and the bottom of the shaft 69 is a feed wheel 74 provided with outwardly-extending, curved arms 75, as clearly shown in Fig. 13, which, when the shaft 70 is rotated in the direction of the arrow, feeds the material from the hopper 61 out over the plate 72 from which it is directed by the nozzle 60 into the carton resting upon the scale platform 33. The upper portion of the shaft 70 has a pinion 76 fixed thereon in mesh with a gear wheel 77 on a shaft 78 which is journaled in a block 79 above the bracket 63 and through which the hollow shaft 69 extends. The shaft 78 has a pinion 80 fixed thereon in mesh with a gear wheel 81 secured on the hollow shaft 69, whereby, when the shaft 70 is turned to feed the material from the hopper 61, the hollow shaft 69 will be turned at a slower speed. The hollow shaft 69 carries spaced arms 82, 83 and 84 within the hopper 61; and these arms with a wire 85 connected thereto and extending between them, form an agitator for agitating the material within the hopper 61 and causing it to feed by gravity downwardly therethrough when the shaft 69 is rotated.

The block 79 has a pin 86 extending therethrough and beyond the respective sides thereof. The ends of the pin 86 extend into slots in arms 87 projecting from a rock shaft 88 which turns in bearings on the bracket 63. The shaft 88 has an arm 89 projecting therefrom which is connected by a link or bar 90 to a hand lever 91 which is fulcrumed at 92 on a plate 93 secured to one of the standards 3. The plate 93 has a series of openings 94 therein any one of which may be entered by a pin 95 projecting from the hand lever 91 to lock the lever in different positions of adjustment. The lever 91 is made of spring metal to permit the pin 95 to be sprung into and from the openings 94. By adjusting the hand lever 91, the block 79 may be raised and lowered; and, when the block 79 is thus raised and lowered, the feeder shafts 69 and 70 will be thereby raised and lowered to adjust the plate 72 toward and from the plate 67 to vary the size of the opening between them through which the material is fed from the hopper 61. By this means I am enabled to regulate and control the quantity of material which shall be fed from the hopper 61 within a given space of time or during each feeding operation.

Loosely mounted on the shaft 70 above the pinion 76 is a pulley 96 which is driven by a belt 97 from a pulley 98 on the main shaft 8, the belt 97 passing around suitable idlers 99 which are mounted on a shaft on a bracket 100 secured to one of the standards 3. The pulley 96 is constantly rotated during the rotating of the main shaft 8, and the pulley 96 is periodically clutched to the shaft 70, to rotate it at certain intervals, by devices which I shall now describe. Slidably mounted on a squared portion of the shaft 70, above the pulley 96, is a clutch collar 101 having upper and lower spaced flanges. The lower flange of the collar 101 has teeth adapted to engage teeth on the hub of the pulley 96 when the collar 101 is lowered into engagement therewith to cause the shaft 70 to rotate with the pulley 96. Embracing the clutch collar 101, between the flanges thereof, is a bifurcated arm 102 projecting from a rock shaft 103 which is adapted to turn in bearing brackets 104 secured to the standards 3. Projecting rearwardly from the shaft 103 is an arm 105 having a projecting pin 106 which is connected by a spring 107 to the hopper bracket 63. The spring 107 tends to rock the shaft 103 to raise the clutch collar 101, and when the spring 107 is permitted to rock the shaft 103, the movement of the shaft by the spring is limited by a stop collar 108 which is adapted to engage the bracket 63 and which is carried by a rod 109 pivoted at its upper end on the pin 106 and extending down through a guide opening in the bracket 63. It will thus be seen that, when the shaft 103 is rocked against the action of the spring 107 to the position shown in the drawings, the clutch collar 101 will be lowered into engagement with the pulley 96 to cause the material within the hopper 61 to be fed therefrom to the carton below the spout 60, and that when the spring 107 is permitted to rock the shaft 103 in the reverse direction, to bring the stop 108 down upon the bracket 63, the clutch collar 101 will be raised from engagement with the pulley 96, thereby stopping the feed of the material from the hopper.

When the shaft 103 is rocked to lower the clutch collar 101 to start the feeding of the material from the hopper 61, a hook 110 pivoted on the pin 106 of the arm 105 engages a tooth 111 on a collar 112 and holds the clutch collar 101 down against the action of the spring 107. The collar 112 is fixed on one end of a shaft 113 which is fitted to turn in brackets 114 on one of the standards 3. The other end of the shaft 113 has an arm 115 fixed thereon which is engaged by a hook 116 on one end of a bell-crank lever 117 which is fulcrumed on a bracket 118 on one of the standards 3. The other end of the lever 117 is connected by a link 119 to the armature 120 of an electromagnet 121 which is mounted on one of the standards 3, whereby, when the magnet 121 is energized, its armature 120 will operate the lever 117 to disengage the hook 116 from the arm 115. When the hook 116 is disengaged from the arm 115, the hook 110 is permitted to turn the shaft 113 and the collar 112 and thereby disengage itself from the tooth 111 by the action of the spring 107 which thereupon rocks the shaft 103 to disengage the clutch collar 101 from the pulley 96. After the hook 110 leaves the tooth 111, the shaft 113 and its arm 115 and collar 112 are returned to the normal position shown in the drawings by a spring 122 which encircles the shaft 113 and has one end engaged therewith and the other end engaged with one of the brackets 114. An arm 123 on the shaft 113 engages a block 124 on the adjacent standard 3 and limits the movement of the shaft 113 when it is returned to normal position. When the hook 116 releases the arm 115, the power of the spring 107 overcomes the action of the spring 122 until the hook 110 is disengaged from the tooth 111. When the hook 110 is disengaged from the tooth 111, a spring 125, connecting the hook 110 with the arm 105, holds a pin 126 on the hook 110 in engagement with the arm 105 and thereby holds the hook 110 in position to be reëngaged with the tooth 111 and causes its reëngagement therewith when the shaft 103 is rocked to engage the clutch collar 101 with the pulley 96; and when the spring 122 returns the arm 115 to normal position, the arm 115 raises the hook 116 which thereafter falls by gravity into reëngagement with the arm 115 for a succeeding releasing operation.

The rock shaft 103 carries an arm 127 provided with an electrical contact making and breaking pin 128 which, when the shaft 103 is rocked to start the feeding of the material from the hopper 61, enters between and electrically connects two contact plates 129 which are insulated from each other and mounted on a bracket on one of the standards 3. When the shaft 103 is rocked to stop the feeding of the material from the hopper 61, the pin 128 is moved from between the contact plates 129 to disconnect them, for a purpose hereinafter explained.

The operation of feeding the material from the hopper 61 to the cartons, and the mechanism, hereinafter described, for moving the cartons from the belt 17 to the scale platform 33 are under the control of a shaft 130 which is rotated at certain intervals and which is governed by the operation of the scale 34 in weighing a carton of material upon the platform 33, and by the presence or absence of a carton against the stop plate 59.

The controlling shaft 130 is mounted to turn in bearings on the frame bar 25 and on one of the standards 3. One end of the shaft 130 extends outwardly and carries a sprocket wheel 131 which is loosely mounted thereon and which is driven by a chain 132 passing around it and a sprocket wheel 133 on the main driving shaft 8, whereby the wheel 131 is constantly rotated. The sprocket wheel 131 is provided with an annular flange 134 which extends laterally therefrom and which is provided with a circular series of spaced notches 135 for a purpose presently explained. Secured to the shaft 130 adjacent to the sprocket wheel 131 is a collar 136 provided with a projecting arm 137. Fulcrumed, at 138, on the arm 137 is a clutch lever 139 having one arm 140 located within the sprocket wheel flange 134 and another arm 141 which extends outwardly beyond the periphery of the flange 134 and then parallel with the axis of the shaft 130 across the outer face of the flange 134. The lever 139 is provided with a projecting pin 142 which is connected by a spring 143 to the collar 137. The spring 143 acts upon the lever 139 to press its arm 140 against the inner face of the flange 134, so that, when the lever 139 is free to act in that manner, the arm 140 will enter one of the notches 135 of the flange 134 and cause the collar 137 and shaft 130 to rotate with the sprocket wheel 131 until the lever 139 is moved against the action of the spring 143, as hereinafter explained, to disengage the arm 140 from the notch in the flange 134, whereupon the shaft 130 will cease to rotate and the sprocket wheel 131 will turn idly thereon.

Pivoted to a bracket 144 on one of the standards 3, are two independently movable, parallel arms 145 and 146, the free ends of which are turned downwardly to form hooks which rest normally upon the sprocket wheel flange 134 in the path of the clutch lever arm 141 when it is rotating with the sprocket wheel 131. When the shaft 130 is rotating with the sprocket wheel 131, as previously explained, and either or both of the arms 145 and 146 are resting upon the flange 134, either or both of the hooks on the arms 145 and 146 will engage the clutch lever arm 141 and thereby disengage the clutch lever arm 140 from the flange notch 135 with which it is engaged and stop the rotation of the shaft 130. When, following that operation, both arms 145 and 146 are raised from the path of the clutch lever arm 141, the spring 143 will again move the clutch lever arm 140 into engagement with one of the notches 135 and the shaft 130 will be again rotated by and with the sprocket wheel 131.

As each carton on the belt 17 comes into engagement with the stop plate 59, the carton engages the lower arm of a lever 147 and moves it outwardly. The lever 147 is fulcrumed on a bracket on the stop plate 59 and the upper arm thereof is connected by a link or rod 148 to one arm of a bell-crank lever 149 which is fulcrumed on the frame bar 7. The other arm of the lever 149 is connected by a link or rod 150 to the pivoted arm 145, whereby when a carton, upon reaching the stop plate 59, moves the lower arm of the lever 147 outwardly, the arm 145 will be raised out of the path of the clutch lever arm 141; and, when the carton is moved away from the stop plate 59, the arm 145 will be returned by gravity to the path of the clutch lever arm 141 while the lever 147 also is returned by gravity to its normal position to be engaged by the next succeeding carton.

When the magnet 121 is energized to disengage the hook 116 from the arm 115 to permit the spring 107 to rock the shaft 103 to stop the feeding of the material from the hopper 61, the pivoted arm 146 is thereby raised from the path of the clutch lever arm 141 by an arm 151 on the rock shaft 103 and a rod 152 connecting the arms 146 and 151.

The rocking of the shaft 103 against the action of the spring 107 to engage the hook 110 with the tooth 111 to start the feeding of the material from the hopper 61 is effected by a crank 153 on the outer end of the shaft 130 and a rod 154 connecting the crank 153 with an arm 155 on the rock shaft 103. The rod 154 is doubled upon itself to form a loop which embraces a pin 156 projecting from the arm 151 and provides certain lost motion between the rod 154 and arm 151. When the shaft 130 is at rest, the crank 153 is up and the top of the loop in the rod 154 is above the pin 156, so that, when the shaft 130 is turned, the shaft 130 will not be rocked by the rod 154 until the crank 153 approaches the limit of its downward movement.

The cartons are moved from the belt 17 to the scale platform 33 by the following mechanism: The inner end of the shaft 130 carries a crank 157 connected by a pitman 158 to an arm 159 which is pivoted at its lower end on a shaft 160 extending between bearings 161 on the standards 3. The upper end of the arm 159 is connected to the rearward end of a horizontal bar 162 which is supported by the frame bar 7 and is slidably fitted to an opening therein. The forward end of the bar 162 carries a pusher plate 163, whereby, when the shaft 130 is rotated, the bar 162, through its connections with the shaft 130, will move the plate 163 forward and back to push the cartons from the belt 17 to the scale platform 33, one at a time, as they successively come up against the stop plate 59. The pusher plate 163 is provided with a rearward extension 164 which, while the plate 163 is pushing a carton from the belt 17 to the platform 33, prevents the succeeding cartons from moving up to the stop plate 59 until the pusher plate is retracted.

When the machine is in operation, each carton, pushed from the belt 17 to the scale platform 33 by the plate 163, pushes the preceding carton from the platform 33 and onto a belt 164 which passes around pulleys 165 and 166 on the shafts 20 and 21 hereinbefore referred to. The pulley 165 is loose on the shaft 20 and the pulley 166 is fast on the shaft 21. The belt 164 is driven in the direction of the arrow in Fig. 5 by a cross belt 167 which passes around pulleys 168 secured on the shafts 20 and 21. It will thus be seen that as rapidly as the cartons are received upon the belt 164 they are advanced thereby away from the scale platform 33. Suitable fixed guide bars 190, shown in Fig. 14 and in side view, partly broken away in Fig. 1, are provided on the respective sides of the belts 17 and 164 to prevent lateral displacement of the cartons therefrom.

The weighing scale 34 is locked against movement, during the time that each carton is being pushed upon the platform 33, and, for this purpose I provide the following: The vertical member 40 of the scale 34 is provided with a projecting pin 170 above which is located the free end of an angle arm 171 projecting from a rock shaft 172 which is mounted to turn in bearings on the frame bar 5. The shaft 172 is provided with an arm 173 which is connected by a bar or link 174 to an arm 175 which is pivoted at one end on a bracket on one of the standards 3. The free end of the arm 175 is pressed down upon a cam 176 on the shaft 130 by the action of a spring 177 which connects the angle arm 171 and frame bar 5 and tends to lower the angle arm 171. When the arm 171 is raised against the action of the spring 177, the scale 34 is unlocked because the pin 170 is permitted to move freely between the arm 171 and the frame bar 5. When, however, the spring 177 is permitted to pull the arm 171 down, the pin 170 will be thereby forced down against the frame bar 5 and the scale will be locked with the platform 33 elevated and in a position slightly below the upper surface of the adjacent portion of the belt 17, and slightly above the upper surface of the adjacent portion of the belt 164. The cam 176 is provided with high and low portions and is shaped as clearly shown in Fig. 2 of the drawings to raise the angle arm 171 against the action of the spring 177 to unlock the scale 34 and to permit the spring 177 to lower the arm 171 to lock the scale during the rotation of the shaft 130.

I shall now describe the electrical connections. Leading from a battery 180 or other suitable source of electric current is a wire 181 which is connected to the contact arm 57. Leading from the contact lever 50 is a wire 182 which is connected to one contact plate 129; and leading from the other contact plate 129 to the electromagnet 121 is a wire 183. Leading from the electromagnet 121 to the battery 180 is a wire 184, thereby completing the circuit which, as will be hereinafter described, is opened and closed between the contact plates 129 and between the arm 57 and lever 50, at certain predetermined intervals.

The operation of the machine is as follows:

The hopper 61 is supplied through the opening 64 with the material which is to be introduced to the cartons, power is applied to the main driving shaft 8 through the pulley 9 and belt 11, and the empty cartons to be supplied with the material from the hopper 61 are placed by hand upon the belt 17, one after the other. As rapidly as the empty cartons advanced by the belt 17 come up against the stop plate 59, they are pushed from the belt 17 to the scale platform 33 and charged or supplied with a predetermined quantity of material from the hopper 61, while on the platform 33, and they are subsequently moved from the platform 33 to the belt 164 which carries them to a suitable point where they are removed by hand.

During the entire period of the operation of the machine, the sprocket wheel 131 for actuating the normally idle shaft 130, the pulley 96 for actuating the feed mechanism of the hopper 61, and the carton carrying belts 17 and 164 are constantly driven by the main shaft 8 and their connections therewith. The operations of the remaining parts of the machine are governed by the controlling shaft 130, which, in turn, is governed by the cartons passing through the machine. In other words, the cartons permit the shaft 130 to be turned a complete revolution at certain intervals under certain conditions, and at each revolution of the shaft 130, the cartons are advanced to move an empty carton from the belt 17 to the platform 33 and to move a filled carton from the platform 33 to the belt 164, and a quantity of material from the hopper 61 is supplied to the carton moved to the platform 33.

At the beginning of the operation, the weight 48 holds the rearward arm of the scale balance member 37 down, the electric circuit is broken between the contact plates 129 and between the arm 57 and lever 50, the hook 110 is disengaged from the tooth 111, the spring 107 holds the clutch collar 101 raised from the pulley 96, and holds the pivoted arm 146 up out of the path of the clutch lever arm 141, and the pivoted arm 145 is resting upon the sprocket wheel flange 134 and is engaged with the clutch lever arm 141, preventing the operation of the controlling shaft 130 by the sprocket wheel 131.

Now, when the foremost carton upon the belt 17 comes up against the stop plate 59, the carton engages and operates the lever 147 to raise the pivoted arm 145, and thereby release the clutch lever arm 141. The spring 143 now moves the clutch lever arm 140 into engagement with the next notch 135 in the flange 134 which reaches the arm 140, and the shaft 130 thereupon starts to turn by and with the sprocket wheel 131.

Immediately after the shaft 130 starts to turn, the arm 175 drops from the high portion of the cam 176 and the spring 177 pulls the angle arm 171 down, thereby holding the pin 170 down and locking the weighing scale 34 with its platform 33 elevated, as previously described. Immediately following the locking of the scale, as the shaft 130 continues to turn, the crank 157 operates the arm 159 to move the pusher plate 163 forward, causing it to engage the carton resting against the stop plate 59, and move the carton from the belt 17 and onto the scale platform 33, while the extension 164 of the pusher plate 163 prevents the belt 17, which now slides under the cartons upon it, from moving the next succeeding carton up against the stop plate 59. When the carton is pushed from the belt 17 to the platform 33, as just described, the carton is moved from the lever 147 and the pivoted arm 145 is thereby permitted to drop back to the sprocket wheel flange 134 to engage the clutch lever arm 141 to arrest the movement of the controlling shaft 130 after it has turned a complete revolution.

While the scale 34 is being locked and the carton is being moved from the belt 17 to the platform 33 the crank arm 153 is moving downwardly and the loop in the rod 152 slides down the respective sides of the pin 156 on the arm 155 without moving the rock shaft 103. After the carton has been pushed upon the scale platform 33, the continued downward movement of the crank arm 153 with the shaft 130 causes the looped end of the rod 152 to engage the pin 156 and rock the shaft 103 against the action of the spring 107, and engage the hook 110 with the tooth 111, whereupon the crank arm 153 passes the limit of its downward movement and the hook 110 holds the shaft 103 against the action of the spring 107 while the crank arm 153 ascends and raises the rod 152 in sliding engagement with the pin 156, as the shaft 130 continues to turn.

During the rocking of the shaft 103 against the action of the spring 107, the high part of the cam 176 raises the arm 175, thereby raising the angle arm 171 from the pin 170 against the action of the spring 177 and unlocking the weighing scale.

When the shaft 103 is rocked against the action of the spring 107, the clutch collar 101 is lowered into engagement with the pulley 96, the pivoted arm 145 is lowered into the path of the clutch lever arm 141, and the pin 128 is lowered between and into engagement with the contact plates 129, electrically connecting the plates but not closing the circuit which remains open between the arm 57 and lever 50. As soon as the clutch collar 101 engages the pulley 96 the shafts 69 and 70 are set in motion by the pulley 96, starting the feeding of the material from the hopper 61 and into the carton upon the scale platform 33. The feeding of the material now continues until the weight of the quantity thereof supplied to the carton lowers the scale platform 33 and raises the vertical member 40 at the rear of the scale. As the vertical member 40 is thus raised, the spring 53 is permitted to raise the lever 50 into contact with the arm 57, thereby closing the electric circuit and energizing the magnet 121. When the magnet 121 is thus energized, its armature 120 operates the hook 116 to release the arm 115, whereupon the spring 107 causes the hook 110 to disengage itself from the tooth 111, and permits the spring 107 to rock the shaft 103 to raise the arms 102 and 151 until the stop 108 engages the bracket 63 to stop the further turning of the shaft 103. Immediately after the hook 110 is disengaged from the tooth 111, the spring 122 returns the tooth 111 to normal position and returns the arm 115 to the hook 116 for a succeeding operation as previously explained. When the arms 127, 102 and 151 are moved by the spring 107, the pin 128 is moved from engagement with the contact plates 129, thereby breaking the electric circuit and deënergizing the magnet 121; the clutch collar 101 is raised from engagement with the pulley 96, thereby stopping the further feeding of the material from the hopper 61 to the carton, and the pivoted arm 146 is raised from the path of the clutch lever arm 141.

The feeding of the material to the carton starts as the crank arm 153 reaches the limit of its downward movement; and, as the crank arm 153 ascends to its normal position, in turning a complete revolution, the cam 176 raises the arms 175 and 171 against the action of the spring 177 to unlock the weighing scale 34, and the pusher plate 163 is retracted, permitting the belt 17 to advance the next succeeding carton up against the stop plate 59, causing the carton to engage and operate the lever 147 to raise the pivoted arm 145 from the path of the clutch lever arm 141.

The controlling shaft 130 comes to rest, after being turned a complete revolution, by the clutch lever arm 141 engaging either or both of the pivoted arms 145 and 146, because the timing of the belt 17 and the feeding of the material from the hopper 61 with relation to the speed of the shaft 130 is such that the arm 145 is not raised by a carton coming up against the lever 147, and the arm 146 is not raised by the completion of the weighing operation, until after the clutch lever arm 141 engages either or both of the arms 145 and 146 to stop the rotation of the controlling shaft 130.

When both arms 145 and 146 are raised from the clutch lever arm 141, the controlling shaft 130 is again permitted to turn a complete revolution for another carton shifting and charging operation, as above described; and during the next and each succeeding carton shifting operations, the filled carton upon the scale platform 33 is pushed therefrom to the belt 164 by the empty carton which is pushed from the belt 17 to and upon the platform 33, and the filled cartons are carried from in front of the scale platform 33 by the belt 164 from which they are removed by hand.

From the foregoing description it will be readily understood that so long as empty cartons are placed upon the belt 17, the cartons will be automatically carried to the stop plate 59, shifted from the belt 17 to the scale platform 33, charged with a predetermined quantity of material from the hopper 61, and then shifted from the platform 33 to the belt 164. It will also be understood that the timing of the operation of the controlling shaft 130, which effects each carton shifting and weighing or charging operation, is governed jointly and entirely by the raising of the pivoted arm 145 by an empty carton coming up against the stop plate 59, and by the raising of the pivoted arm 146 by the rock shaft 103 at the completion of a weighing operation. Therefore, when there is no empty carton present against the stop plate 59 to be moved into the place of a previously charged carton upon the platform 33, the raising of the arm 146 by the completion of the weighing or charging operation will not start the operation of the controlling shaft 130, because the arm 145 will remain down; and when an empty carton coming up against the stop plate 59 and lever 147 raises the arm 145 before the completion of the weighing or charging operation, the arm 146 will prevent the starting of the shaft 130 until the charging operation is complete.

I claim:

1. The combination of a weighing device adapted to receive a receptacle, said device having a part adapted to be moved by a predetermined weight of material introduced to a receptacle thereon, a conveyer adapted to support and advance a receptacle to a position adjacent to said device, means to actuate the conveyer, a stop to prevent further movement of the receptacle by the conveyer when the receptacle reaches said position, normally idle means to move said receptacle from said position to said device, and means controlled by said part when moved to automatically actuate said normally idle means.

2. The combination of a weighing device adapted to receive a receptacle, said device having a part adapted to be moved by a predetermined weight of material introduced to a receptacle thereon, means for supporting and advancing the receptacle to a position adjacent to said device, normally idle means to move said receptacle from said position to said device, a normally open electric circuit, means operated by said part when moved to close said circuit, a movable member operated by said circuit when closed, and means controlled by said member when operated to automatically actuate said normally idle means.

3. The combination of a weighing device adapted to receive a receptacle, said device having a part adapted to be moved by a predetermined weight of material introduced to a receptacle thereon, a conveyer adapted to support and advance a receptacle to a position adjacent to said device, means to actuate the conveyer, a stop to prevent further movement of the receptacle by the conveyer when the receptacle reaches said position, normally idle means to move said receptacle from said position to said device, a normally open electric circuit, means operated by said part when moved to close said circuit, a movable member operated by said circuit when closed, and means controlled by said member when operated to automatically actuate said normally idle means.

4. The combination of a weighing device adapted to receive a receptacle, said device having a part adapted to be moved by a predetermined weight of material introduced to a receptacle thereon, means for supporting and advancing the receptacle to a position adjacent to said device, and means controlled by said part when moved to automatically move the receptacle from said position to said device.

5. The combination of a weighing device adapted to receive a receptacle, said device having a part adapted to be moved by a predetermined weight of material introduced to a receptacle thereon, a conveyer adapted to support and advance a receptacle to a position adjacent to said device, means to actuate the conveyer, a stop to prevent further movement of the receptacle by the conveyer when the receptacle reaches said position, and means controlled by said part when moved to automatically move the receptacle from said position to said device.

6. The combination of a weighing device adapted to receive a receptacle, said device having a part adapted to be moved by a predetermined weight of material introduced to a receptacle thereon, means for supporting and advancing the receptacle to a position adjacent to said device, a normally idle controlling shaft, means operated by said shaft when it is turned to move said receptacle from said position to said device, and means controlled by said part when moved to automatically turn said shaft.

7. The combination of a weighing device adapted to receive a receptacle, said device having a part adapted to be moved by a predetermined weight of material introduced to a receptacle thereon, a conveyer adapted to support and advance a receptacle to a position adjacent to said device, means to actuate the conveyer, a stop to prevent further movement of the receptacle by the conveyer when the receptacle reaches said position, a normally idle controlling shaft, means operated by said shaft when it is turned to move said receptacle from said position to said device, and means controlled by said part when moved to automatically turn said shaft.

8. The combination of a receptacle, a weighing device adapted to receive the receptacle, a conveyer adapted to support the receptacle and advance it to a position adjacent to said device, means to actuate the conveyer, a stop to prevent further movement of the receptacle by the conveyer when the receptacle reaches said position, and means controlled by said receptacle to automatically move said receptacle from said position to said device.

9. The combination of a receptacle, a weighing device adapted to receive the receptacle, means for supporting and advancing the receptacle to a position adjacent to said device, a normally idle controlling shaft, means operated by said shaft when it is turned to move said receptacle from said position to said device, and means controlled by said receptacle to automatically turn said shaft when said receptacle reaches said position.

10. The combination of a receptacle, a weighing device adapted to receive the receptacle, means for supporting and advancing the receptacle to a position adjacent to said device, a part adapted to be moved by the receptacle from its path when the receptacle is advanced to said position to automatically return to said path when the receptacle is moved from engagement therewith, and means controlled by said part when moved from said path to automatically move the receptacle from said position to said device.

11. The combination of a receptacle, a weighing device adapted to receive the receptacle, means for supporting and advancing the receptacle to a position adjacent to said device, a part adapted to be moved by the receptacle from its path when the receptacle is advanced to said position to automatically return to said path when the receptacle is moved from engagement therewith, normally idle means to move said receptacle from said position to said device, and means including a clutch device released by said part when moved from said path to actuate said normally idle means.

12. The combination of two conveyers arranged in spaced relation to each other and adapted to receive and advance receptacles successively, means for actuating the conveyers, a weighing device including a platform between said conveyers adapted to receive the receptacles successively, a stop to limit the movement of the receptacles by one conveyer as they successively reach a position adjacent to said platform, and means to automatically move the receptacles successively from said position on one conveyer to said platform and from said platform to the other conveyer, the last named means being controlled by the receptacles successively as they are moved to said position.

13. The combination of a weighing device adapted to receive and support receptacles for the material to be weighed, a conveyer for supporting and advancing the receptacles successively to a position adjacent to said device, means for actuating the conveyer, means to move the receptacles successively from said position to said device, and means controlled by said receptacles successively when they are moved to said position to introduce material to be weighed to the receptacle upon said device.

14. The combination of a weighing device adapted to receive receptacles for the material to be weighed, said device having a part adapted to be moved by a predetermined weight of material introduced to a receptacle thereon, a conveyer for supporting and advancing the receptacles successively to a position adjacent to said device, means for actuating the conveyer, means to move the receptacles successively from said position to said device, and means to feed material to be weighed to the receptacle upon said device, the last named means including a member movable into and from an operative position, starting the feed of the material when moved into the operative position and stopping the feed of the material when moved from the operative position, the movement of said member into operative position being controlled by each receptacle as it is moved to said position, and the movement of said member from said position being controlled by said part when it is moved under the influence of the material being weighed.

15. The combination of a receptacle, a weighing device adapted to receive the receptacle, said device having a part adapted to be moved by the weight of a predetermined quantity of material introduced to a receptacle thereon, means for supporting and advancing the receptacle to a position adjacent to said device, mechanism controlled by the receptacle when it is moved to said position to automatically move the receptacle from said position to said device, and means to automatically feed a predetermined quantity of material to the receptacle when it is on said device, the starting of the feeding of the material being controlled by said mechanism and the stopping of the feeding of the material being controlled by said part.

16. The combination of a receptacle, a weighing device adapted to receive the receptacle, said device having a part adapted to be moved by the weight of a predetermined quantity of material introduced to a receptacle thereon, means for supporting and advancing the receptacle to a position adjacent to said device, mechanism controlled by the receptacle when it is moved to said position to automatically move the receptacle from said position to said device, and means to automatically start and stop the feeding of material to the receptacle when it is on said device, the last named means including a normally open electric circuit and a part operated thereby when the circuit is closed to stop the feeding of the material, and said part closing said circuit when moved by the weight of material introduced to the receptacle on said device.

17. The combination of a receptacle, a weighing device adapted to receive the receptacle, said device having a part adapted to be moved by the weight of a predetermined quantity of material introduced to a receptacle thereon, means for supporting and advancing the receptacle to a position adjacent to said device, mechanism controlled by the receptacle when it is moved to said position, and means to automatically move the receptacle from said position, and means to automatically start and stop the feeding of material to the receptacle when it is on said device, the last named means including an electric circuit which is normally open at two points and a part operated thereby when the circuit is closed to stop the feeding of the material, and said circuit being closed at one point by said mechanism and at the other point by the operation of said part.

18. The combination of a supporting frame, a weighing device, means to support and advance receptacles successively to said device, and means to automatically start and stop the feeding of material to the receptacle successively as they separately occupy a position upon said device, the last named means including an electric circuit normally open at two points and closing and opening means for said circuit at each of said points, the starting of the feeding of the material being controlled by the receptacles successively before they reach said device, the stopping of the feeding of the material being effected by said circuit when closed, the closing of said circuit at one of said points being effected under the control of the receptacles successively before they reach said device, the closing of said circuit at the other of said points being effected under the control of said device during the weighing operation, and the opening of said circuit at one of said points being automatically effected immediately after the closing of the circuit.

19. The combination of a supporting frame, a feed hopper having a discharge opening therein, a feed controlling device movable into and from an operative position, discharging material from the hopper when in the operative position and stopping the discharge of material when moved to the inoperative position, means operative to move said device into operative position, a spring to move said device into inoperative position, a movable member, a latch device to hold said member in a predetermined position and operative to release the same, and a latch device to engage said member and hold said controlling device in the operative position and to be released by said member when said member moves after being released by the first named latch device.

20. The combination of a supporting frame, a feed hopper having a discharge opening therein, a feed controlling device movable into and from an operative position, discharging material from the hopper when in the operative position and stopping the discharge of material when moved to the inoperative position, means operative to move said device into operative position, a spring to move said device into inoperative position, a movable member, a latch device to hold said member in a predetermined position and operative to release the same, a latch device to engage said member and hold said controlling device in the operative position and to be released by said member when said member moves after being released by the first named latch device, and means to automatically return said member to the first named latch device after said member is released by the second named latch device.

21. The combination of a supporting frame, a feed hopper having a discharge opening therein, a feed controlling device movable into and from an operative position, discharging material from the hopper when in the operative position and stopping the discharge of material when moved to the inoperative position, means operative to move said device into operative position, a spring to move said device into inoperative position, a movable member, a latch device to hold said member in a predetermined position and operative to release the same, a latch device to engage said member and hold said controlling device in the operative position and to be released by said member when said member moves after being released by the first named latch device, an electric circuit normally open at two points, means operated by said circuit when closed to operate the first named latch device, means operative to open and close said circuit at one of said points, and means operated by said controlling device to open and close said circuit at the other of said points, the last named means moving to circuit closing position when the controlling device is moved to the operative position and moving to circuit opening position when the controlling device is moved to the inoperative position.

22. The combination of a supporting frame, a feed hopper having a discharge opening therein, a feed controlling device movable into and from an operative position, discharging material from the hopper when in the operative position and stopping the discharge of material when moved to the inoperative position, means operative to move said device into operative position, a spring to move said device into inoperative position, a movable member, a latch device to hold said member in a predetermined position and operative to release the same, a latch device to engage said member and hold said controlling device in the operative position and to be released by said member when said member moves after being released by the first named latch device, means to automatically return said member to the first named latch device after said member is released by the second named latch device, an electric circuit normally open at two points, means operated by said circuit when closed to operate the first named latch device, means operative to open and close said circuit at one of said points, and means operated by said controlling device to open and close said circuit at the other of said points, the last named means moving to circuit closing position when the controlling device is moved to the operative position and moving to circuit opening position when the controlling device is moved to the inoperative position.

In testimony whereof I affix my signature hereto.

CHARLES L. BOND.